(12) United States Patent
Satou et al.

(10) Patent No.: US 6,796,399 B2
(45) Date of Patent: Sep. 28, 2004

(54) AUTOMOBILE DRIVING CONTROL DEVICE FOR BRAKING A DRIVING SHAFT

(75) Inventors: Kazuhiko Satou, Mito (JP); Toshimichi Minowa, Mito (JP); Satoru Kuragaki, Hitachi (JP); Tokuji Yoshikawa, Hitachi (JP); Tatsuya Ochi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/317,133

(22) Filed: Dec. 12, 2002

(65) Prior Publication Data

US 2003/0146035 A1 Aug. 7, 2003

Related U.S. Application Data

(62) Division of application No. 09/676,247, filed on Sep. 29, 2000, now Pat. No. 6,510,911.

(30) Foreign Application Priority Data

Sep. 29, 1999 (JP) ........................................... 11-277036

(51) Int. Cl.[7] ............................................. B60K 17/00
(52) U.S. Cl. .................................................... 180/370
(58) Field of Search ........................ 180/370, 65.2–65.4, 180/197, 233–250; 188/303; 74/424; 475/344

(56) References Cited

U.S. PATENT DOCUMENTS

| | | | | |
|---|---|---|---|---|
| 3,963,085 A | * | 6/1976 | Vinton ......................... | 180/247 |
| 4,125,026 A | * | 11/1978 | Torii et al. .................. | 29/893.1 |
| 4,289,047 A | * | 9/1981 | Hopkins ...................... | 475/246 |
| 4,499,965 A | * | 2/1985 | Oetting et al. .............. | 180/165 |
| 4,562,894 A | | 1/1986 | Yang .......................... | 180/65.2 |
| 4,597,312 A | | 7/1986 | Hicks et al. ................. | 74/695 |
| 4,895,217 A | * | 1/1990 | Hueckler et al. ........... | 180/233 |
| 4,991,679 A | * | 2/1991 | Fujii et al. .................. | 180/233 |
| 5,067,932 A | * | 11/1991 | Edwards ..................... | 180/65.5 |
| 5,195,600 A | * | 3/1993 | Dorgan ....................... | 180/305 |
| 5,282,774 A | | 2/1994 | Okada ......................... | 475/84 |
| 5,301,769 A | * | 4/1994 | Weiss ......................... | 180/249 |
| 5,366,040 A | | 11/1994 | Irikura et al. ............... | 180/244 |
| 5,450,921 A | * | 9/1995 | Kameda et al. ............. | 180/297 |
| 5,773,904 A | * | 6/1998 | Schiebold et al. ........... | 310/92 |
| 6,135,229 A | * | 10/2000 | Arimatsu .................... | 180/248 |
| 6,149,544 A | * | 11/2000 | Masberg et al. ............. | 477/13 |
| 6,299,562 B1 | * | 10/2001 | Kim ........................... | 475/221 |
| 6,428,438 B1 | * | 8/2002 | Bowen ........................ | 475/5 |
| 6,510,911 B1 | * | 1/2003 | Satou et al. ................. | 180/65.2 |

FOREIGN PATENT DOCUMENTS

| | | | |
|---|---|---|---|
| DE | 36 17 074 | 11/1987 | |
| JP | 58137642 A | * 8/1983 | ............ F16H/1/14 |
| JP | 59144856 A | * 8/1984 | ........... F16H/57/02 |
| JP | 5-118393 | 5/1993 | |
| JP | 6-040315 | 2/1994 | |
| JP | A-6-40315 | 12/1994 | |
| JP | 10-114260 | 5/1998 | |
| JP | A-10-114260 | 6/1998 | |

* cited by examiner

Primary Examiner—Lesley D. Morris
Assistant Examiner—Paul Royal, Jr.
(74) Attorney, Agent, or Firm—Crowell & Moring LLP (57) ABSTRACT

An automobile which is designed to be able to drive wheel tires by making use of a double series differential gear device 15 provided with both a first series gear constituted by a first ring gear 22A and a first drive gear 23A and a second series gear constituted by a second ring gear 22B and a second drive gear 23B, thereby, a back-up for an abnormal situation can be prepared and a high reliability is maintained, accordingly, with the use of highly reliable differential gear mechanism, an automobile in which a stable braking force is always obtained without being affected by its environmental conditions is provided.

2 Claims, 7 Drawing Sheets

AUTOMOBILE DRIVING CONTROL DEVICE FOR BRAKING A DRIVING SHAFT

This is a Divisional of Ser. No. 09/676,247 filed on Sep. 29, 2000 now U.S. Pat. No. 6,510,911.

BACKGROUND OF THE INVENTION

1. Field of the Invention

The present invention relates to an automobile with a brake device and, in particular relates to an automobile of a type in which a plurality of wheel tires are driven in common.

2. Conventional Art

A brake device is an indispensable mechanism for an automobile. An automobile driven by an internal combustion engine generally has being used a so called a friction type brake device in which a hydraulic pressure generated through a brake pedal pressing force by a driver is transmitted to a brake mechanism (which is generally a friction brake mechanism) mounted near respective wheel tires via hydraulic pressure pipings to obtain a braking force there through friction between braking members while converting the kinetic energy into thermal energy.

On the other hand, in an automobile such as an electric car and a hybrid car which uses an electric motor as a drive power source or uses an electric motor and an internal combustion engine jointly as a drive power source, a dynamic braking device or a regenerative braking device is used in parallel with the friction type braking device in which the electric motor serving as the drive power source is caused to operate as an electric generator and converts the kinetic energy to electric energy, and the generated electric power is caused to be absorbed in a resistor or a battery so as to obtain a braking force, however, even in this instance the friction type braking device plays a major roll in the entire braking device.

In a conventional friction type braking device for an automobile, a brake drum or a brake disk serving as a part of the brake members and being attached to a wheel body of the wheel tire is generally exposed as it is so as to enhance heat radiation thereof.

As a result, since the brake mechanism is mounted near the wheel tire, for example, during a bad weather, rain, snow and mud splashed by the wheel tires hits to the brake members and intrudes onto the friction faces of the brake members which changes the friction coefficient of the friction faces, thereby, generation of a braking force corresponding to the brake hydraulic pressure is prevented, and the braking force is unstabilized.

Therefore, under such bad condition it is possible that the braking force actually provided reduces below a braking force to be generated based on the inherent braking hydraulic pressure, moreover, it is difficult or almost impossible to predict the generation of the braking force shortage including amount of the shortage.

As a result, for example, in a case of automatic braking mode during traffic jam in which a braking is automatically actuated while following the movement of a vehicle ahead and in a case of emergency braking which requires a precise control, the braking distance can exceed an allowable range which increases possibility of rear-end collision and puts the vehicle under an extremely dangerous condition.

Further, the conventional braking device requires the hydraulic pipings to the respective braking mechanisms for the respective wheel tires, the structure thereof complexes and the weight therefor increases which raises the manufacturing cost thereof.

In order to overcome the above problems, an automobile in which a friction braking mechanism is provided at a common revolution shaft (a propeller shaft) for transmitting torque from a drive power source such as an internal combustion engine to respective wheel tires has been proposed as disclosed, for example, in JP-A-6-40315 (1994) and JP-A-10-114260 (1998).

The above conventional art does not necessary take into account a stable braking force generation which poses a problem with regard to reliability.

Namely, in the conventional art, because of the provision of the braking device at the common revolution shaft, braking forces (or braking torque) for the respective wheel tires are transmitted via a differential gear mechanism, therefore, if any abnormality is generated in this differential gear mechanism, the braking function is possibly damaged and the problem with regard to reliability is caused.

Further, when any abnormality is caused in the differential gear mechanism, the driving force transmission from the drive power source is also affected and the running function of the vehicle is possibly damaged.

Further, when the braking device is provided at the common revolution shaft, both the frequency of torque transmission and amount of torque to be transmitted through the differential gear mechanism increase which particularly causes a problem.

Still further, when the braking force is not transmitted, fail safe function is lost which again causes a serious problem.

SUMMARY OF THE INVENTION

The present invention is carried out in view of the above problems, and an object of the present invention is to provide an automobile which is designed to have a fully reliable differential gear mechanism and to generate always a stable braking force without being affected by environment concerned.

The above object is achieved by an automobile of a type in which a differential gear mechanism including at least a ring gear and a drive gear for revolution drive in a planetary gear is used and a drive power source and a plurality of wheel tires are torque-coupled via a common revolution shaft, wherein the ring gear and the drive gear for revolution drive in the planetary gear are constituted by two series of gear mechanisms of first and second gear mechanisms having a same reduction gear ratio but having different diameters each other and an engagement play clearance between the ring gear and the drive gear in one of the two series of gear mechanisms is differentiated from an engagement play clearance between the ring gear and the drive gear in the other of the two series of gear mechanisms.

Further, the above object can be achieved when a braking device is further provided at the above common revolution shaft and is always used as a brake for stopping the running of the automobile.

Still further, the above object can be also achieved when the above braking device is formed into a common unit with a speed change gear (a transmission) disposed between the revolution shaft and a drive power device.

Still further, the above object can be also achieved through a provision of a torque distribution unit which distributes braking torque generated from the braking device.

Moreover, the above object can be also achieved when the braking device is constituted by a dynamic braking device which also serves as an electric motor for driving the automobile.

With the above structure, even when an abnormality is caused in one of the two gear mechanisms of the differential gear mechanism, a fail safe function is activated in which the torque transmission is simply shifted to the other gear mechanism, and the torque transmission function including the braking torque is not damaged, thereby, a higher reliability is always obtained.

As a result, during running under a bad weather or on a bad conditioned road, the braking device is prevented from being affected from such as splashed water and mud from the wheel tires, accordingly, a braking force instability which is caused when the friction coefficient of the friction faces of the braking device changes is prevented, and a stable braking capacity can always be obtained under any environmental conditions concerned, thereby, an automobile excellent with regard to reliability and safety can be obtained.

Further, since the braking device is collectively located, the pipings for operating medium such as hydraulic pressure oil is simplified and light-weighted which reduces the manufacturing cost thereof.

Preferably, when the above braking device is provided at the speed change gear, for example, when a braking function is provided for a multiple disk clutch in the speed change gear, the braking device can be collected into a single unit which simplifies the structure thereof.

Further preferably, with the provision of the torque distribution unit which distributes braking torque generated from the braking device to the respective wheel tires, in a case when a unique braking force is required such as when road surface friction coefficients at right and left side wheel tires are different and when individual unique braking forces have to be provided for respective four wheel tires when the automobile is turning along a curved road, a braking torque is caused to be generated during the braking operation from the braking device as well as the torque distribution unit is activated to distribute the braking torque properly to the respective wheel tires, thereby, a possible occurrence of dangerous locking at the front wheel tires alone or at the rear wheel tires alone is prevented, and a braking force can always be obtained effectively from the running road face. Further, such as the clutch mechanism and the differential gear mechanism can be utilized as the torque distribution unit.

Still further preferably, through the provision of the electric motor at the speed change gear which regenerates energy during deceleration, for example, in a case of braking from a high speed travelling, namely, in a case when it is judged that energy conversion efficiency to be regenerated by the electric motor being operated as a generator is large, the dynamic braking is used in parallel with the friction braking to generate a braking torque due to conversion resistance when converting a kinetic energy of the vehicle into an electric energy, and the generated braking torque is distributed by the torque distribution unit so as to provide properly distributed braking forces to the respective wheel tires.

In this instance, when the converted electric energy is stored such as in a battery, the stored electrical energy can be reused, for example, as a driving force by supplying the electrical energy to the electrical motor during driving, thereby, an effective energy use can be achieved.

Now, when it is judged that the energy conversion efficiency through the generator operation of the electric motor is small, the braking force is provided from the braking device.

DETAILED DESCRIPTION OF THE EMBODIMENTS

Hereinbelow, an automobile according to the present invention will be explained in detail with reference to embodiments as shown in the drawings.

However, the present invention is not limited to these embodiments.

Figure 1:
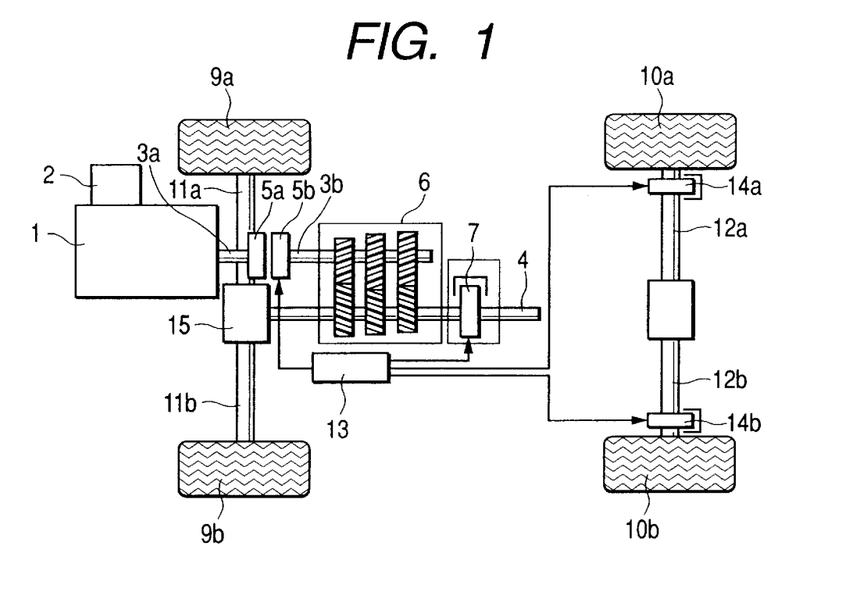
FIG. 1 is a system diagram showing a first embodiment of an automobile according to the present invention.

FIG. 1 shows a first embodiment of the present invention in which numeral 1 is a drive power device (engine), numeral 2 is a throttle valve, numeral 3a is an output shaft of the engine, numeral 3b is an output shaft of a clutch, numeral 4 is a drive shaft (a common revolution shaft), numerals 5a and 5b are clutch plates, numeral 6 is a speed change gear (a transmission), numeral 7 is a concentrated braking device, numerals 9a and 9b are front wheel tires, numerals 10a and 10b are rear wheel tires, numerals 11a and 11b are front wheel shafts, numerals 12a and 12b are rear wheel shafts, numeral 13 is a hydraulic pressure mechanism, numerals 14a and 14b are braking device for the wheel tires and numeral 15 is a double series differential gear device.

FIG. 1 is an embodiment in which the present invention is applied to an FF (front located engine and front wheel tire drive) type automobile. A different point of the present embodiment from a conventional FF type automobile is that no braking device for wheel tires is provided at the front wheel shafts 11a and 11b, instead thereof the concentrated braking device 7 formed into a unit is provided at the common drive shaft 4 called generally as a propeller shaft, further, another important difference of the present embodiment from the conventional art is that the double series differential gear device 15 is provided as the differential gear device.

The double series differential gear device 15 in the present embodiment is constituted in such a manner that the ring gear and drive gear for revolution drive use in a planetary gear are constituted by two series of gear mechanisms of first and second gear mechanisms having a same reduction gear ratio but having different diameters, further, an engagement play clearance set between the ring gear and the drive gear for one of the two series of gear mechanism is differentiated from an engagement play clearance set between the ring gear and the drive gear for the other of the two series of gear mechanism, which will be explained in detail later.

The clutch plates 5a and 5b constitute a usual single plate type clutch, and as the transmission 6, any type of transmissions can be used such as a manual shift type multi stage transmission, an automatic transmission formed by combining a torque converter and a multi stage reduction gear ratio gear mechanism and a belt type non-stage transmission.

The hydraulic pressure mechanism 13 generates a predetermined hydraulic pressure in response to manipulation of a clutch pedal (not shown) or a brake pedal (not shown) or in response to a command from an automobile control device (not shown), and functions to supply the hydraulic pressure to respective actuators for the clutch and the brake device as indicated by arrows. The actuators for the clutch and the brake device are generally constituted by a hydraulic cylinder and a piston.

Further, the hydraulic pressure mechanism 13 can be constituted by a hydraulic pressure control unit in which movements of the clutch pedal and the brake pedal are detected by a sensor as electrical signals to establish predetermined hydraulic pressures and which are supplied to the respective actuators of the clutch and the brake device.

Now, an operation of the present embodiment will be explained.

Movement of the automobile is started in such a manner that, at first, the throttle valve 2 is opened in response to pressing manipulation of an acceleration pedal (not shown), revolution speed of the drive power device 1 is controlled and through manipulation of a clutch pedal (not shown) the clutch plates 5a and 5b are coupled.

Thereby, the drive power device 1 generates torque which is transmitted from the output shaft 3a via the clutch plates 5a and 5b to the output shaft 3b, and is further supplied from the output shaft 3b to the transmission 6 where the revolution speed and the torque are adjusted.

Drive torque outputted from the transmission 6 is transmitted via the drive shaft 4 and the double series differential gear device 15 to the front wheel shafts 11a and 11b, through revolution drive of the front wheel tires coupled to these front wheel shafts 11a and 11b, a propelling force is generated between the wheel tires and the road surface, thereby, the automobile is driven and moved.

On the other hand, during braking operation through pressing of the brake pedal (not shown) and in response to the pressing force a predetermined hydraulic pressure is applied from the hydraulic pressure mechanism 13 to the concentrated braking device 7 and to the braking devices 14a and 14b for wheel tires as shown in arrows, thereby, through the concentrated braking device 7 a braking torque is provided to the drive shaft 4, and through the braking devices 14a and 14b for the wheel tires respective braking torques are provided for the rear wheel tires 10a and 10b.

Namely, the braking torque generated by the concentrated braking device 7 is transmitted via the drive shaft 4 and the double series differential gear device 15 to the front wheel shafts 11a and 11b, and finally transmitted to the front wheel tires 9a and 9b as braking forces. Further, the braking torque generated by the braking devices 14a and 14b for wheel tires are transmitted to the rear wheel tires 10a and 10b as they are to establish braking forces.

Therefore, according to the present embodiment as shown in FIG. 1, braking devices for wheel tires to be mounted for the front wheel shafts 11a and 11b are collected into the concentrated braking device 7 of a single series, the structure thereof is simplified. Moreover, since the concentrated braking device 7 can be mounted at the body side of the automobile, the concentrated braking device 7 can be formed into a unit which can prevent intrusion of rain, snow and mud thereinto, therefore, a possible unstable braking performance is avoided and a stable braking force is always obtained.

Further, in the present embodiment, the concentrated braking device 7 is located in front of the double series differential gear device 15 forming generally a speed reduction system when seen from the drive power device 1, therefore, a braking torque amplified by "drive shaft revolution speed/wheel shaft revolution speed" times through the reduction gear ratio (generally called as final reduction gear ratio) of the double series differential gear device 15 is provided for the side of the wheel tires.

For example, since the final reduction gear ratio is usually set at about 4, the braking torque required for the drive shaft 4 will be sufficient at about ¼ of the braking torque required for the wheel shafts 11a and 11b.

Further, the final reduction gear ratio is generally determined by the number of teeth of the ring gear and the drive gear included in the double series differential gear device 15.

Therefore, according to the present embodiment, the hydraulic pressure required for the concentrated braking device 7 is reduced to about ¼, as a result, specification or requirement for a hydraulic pressure unit for braking devices (not shown) including the hydraulic pressure mechanism 13 is greatly lowered which contributes to further cost reduction thereof.

On the other hand, since a plurality of braking devices for wheel tires provided generally in the conventional art are collected into the concentrated braking device 7 in a single unit in the present embodiment, therefore, if a same type of single braking device is used therefor, an area of the friction face will be multiplied by the number of collected braking devices, in that with regard to FIG. 1 embodiment the friction face area is doubled which possibly increases the size of the braking device.

However, when a disk brake device is used as the braking device, like a well known multi plate clutch it will be sufficient if a necessary number of brake plates is provided in the axial direction, with this measure a necessary friction area can be ensured without enlarging the diameter of the brake plates.

Further, in the present embodiment, although braking devices for wheel tires are not provided for the front wheel shafts 11a and 11b, however, the same can be provided therefor.

Still further, when the concentrated braking device 7 is located at a position on the drive shaft which is hardly affected by the environment because of the structure of the automobile concerned such as by means of a shielding plate, the concentrated braking device 7 can be exposed as it is without accommodating the same in a unit casing.

Figure 2:
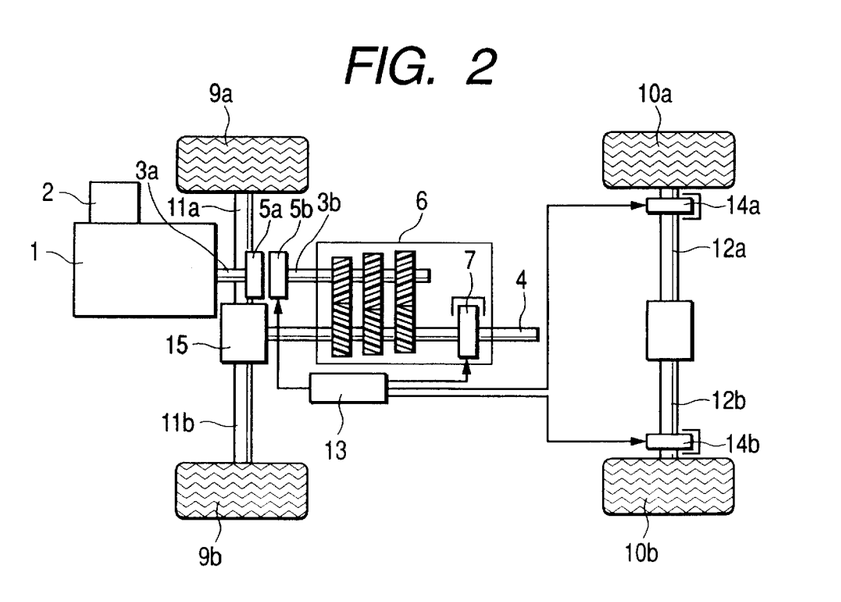
FIG. 2 is a system diagram showing a second embodiment of an automobile according to the present invention.

FIG. 2 is a second embodiment of the present invention. A different point of the automobile illustrated in FIG. 2 from FIG. 1 embodiment is that the concentrated braking device 7 is accommodated in the unit casing of the transmission 6 and the other structure thereof is substantially the same as that in FIG. 1 automobile.

Accordingly, with FIG. 2 embodiment substantially the same functions and advantages as those of FIG. 1 embodiment can be obtained, in that with a simple structure a possible unstable braking performance is avoided and a stable braking force can always be obtained.

Further, according to FIG. 2 embodiment, when the transmission 6 includes a multi plate clutch in the unit casing, for example, such as an automatic transmission, the transmission 6 itself can be constituted to serve as the concentrated braking device 7 by providing a braking function for the multi plate clutch.

Figure 12:
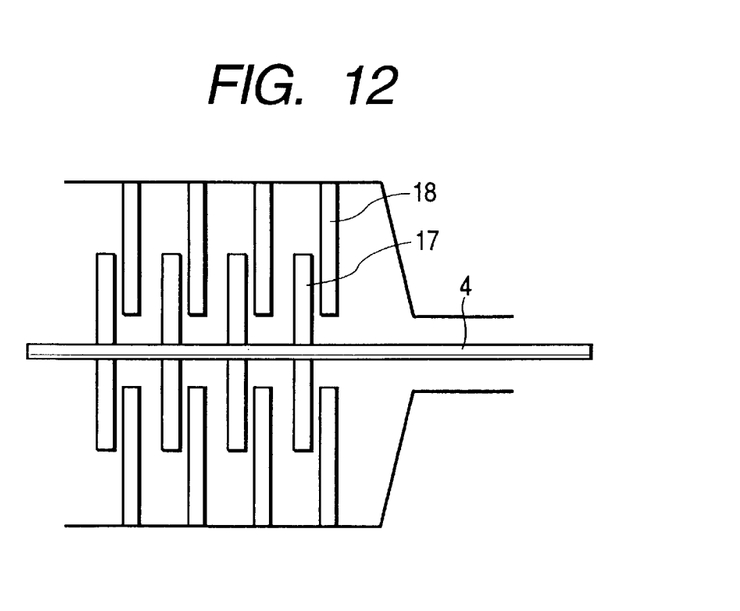
FIG. 12 is a view for explaining an example of a multiple disk clutch type braking device used in any of the embodiments according to the present invention.

Now, an example of a multi plate clutch included in the transmission 6 is shown in FIG. 12.

The multi plate clutch as illustrated in FIG. 12 is constituted by a plurality of clutch plates 17 provided along the drive shaft 4 and a plurality of separate friction walls 18 each provided for the corresponding clutch plate.

During braking operation, the drive shaft 4 is displaced rightward by an actuator to thereby contact the clutch plates 17 to the separate friction walls 18 and through the friction generated at the contacted portions a braking torque is generated.

Therefore, according to the present embodiment the transmission 6 and the concentrated braking device 7 are integrated into a unit, thereby, the structure thereof is simplified and further, the reliability thereof is increased.

Further, the transmission 6 can further accommodate other mechanisms therein, for example, such as a cooling device and a wear powder removing mechanism.

Figure 3:
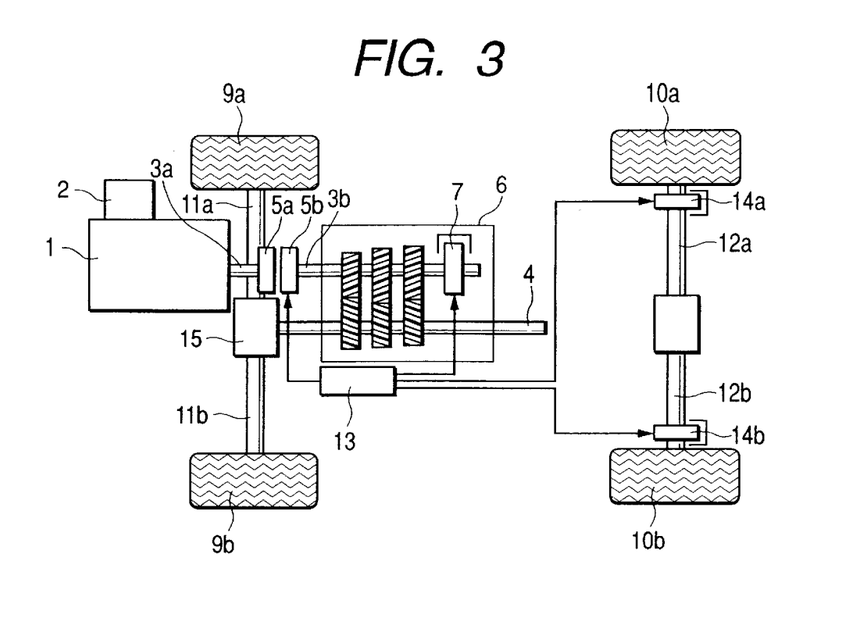
FIG. 3 is a system diagram showing a third embodiment of an automobile according to the present invention.

FIG. 3 is a third embodiment of the present invention. A different point of the automobile as shown in FIG. 3 from FIG. 2 embodiment is that the concentrated braking device 7 is provided at the clutch output shaft 3b other than the drive shaft 4, and the other structure thereof is substantially the same as that of FIG. 2 embodiment.

Accordingly, with FIG. 3 embodiment substantially the same functions and advantages as those of FIG. 2 embodiment can be obtained, in that with a simple structure a possible unstable braking performance is avoided and a stable braking force can always be obtained.

Figure 4:
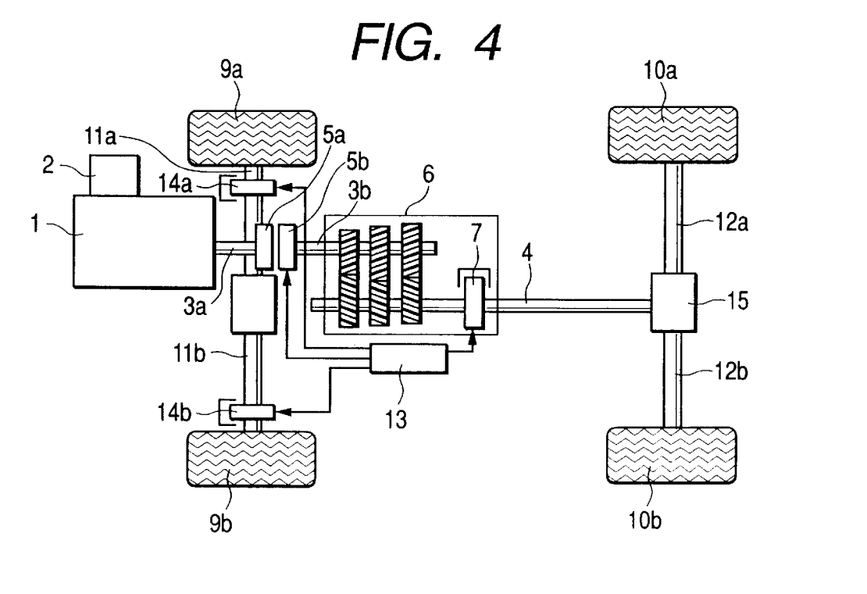
FIG. 4 is a system diagram showing a fourth embodiment of an automobile according to the present invention.

FIG. 4 shows an automobile representing a fourth embodiment of the present invention. In FIG. 4 embodiment the present invention is applied to a FR (front located engine and rear wheel tire drive) type automobile, therefore, a different point of the present embodiment from FIG. 2 embodiment is that the double series differential gear device 15 is coupled to the rear wheel shafts 12a and 12b and the braking devices 14a and 14b for wheel tires are provided for the front wheel shafts 11a and 11b other than the rear wheel shafts 12a and 12b, and the other structure thereof is substantially the same as that of FIG. 2 embodiment.

Accordingly, the operation of FIG. 4 embodiment is as same as that of FIG. 2 automobile when exchanging the front wheel side to the rear wheel side and the rear wheel side to the front wheel side, therefore, like FIG. 2 embodiment with a simple structure a possible unstable braking performance is avoided and a stable braking force can always be obtained.

Figure 5:
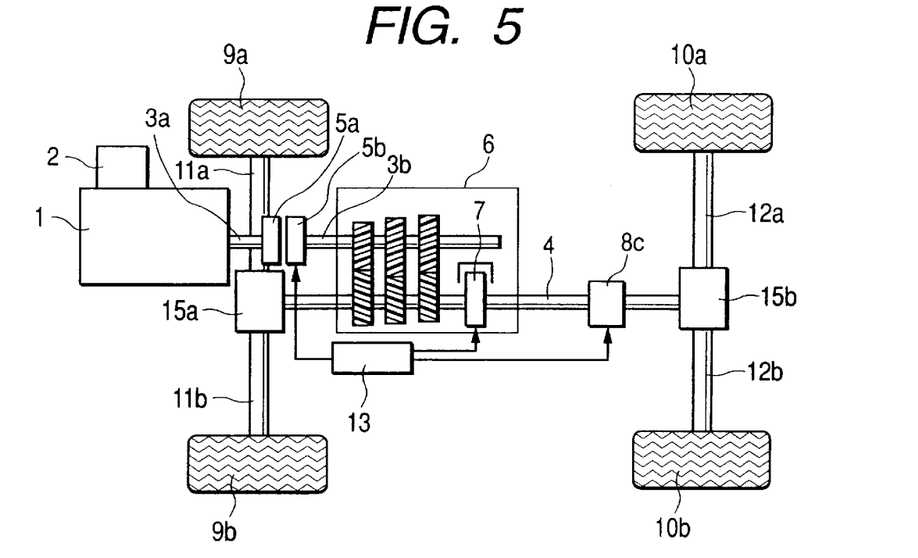
FIG. 5 is a system diagram showing a fifth embodiment of an automobile according to the present invention.

FIG. 5 shows an automobile representing a fifth embodiment of the present invention. In FIG. 5 embodiment the present invention is applied to a 4WD (four wheel drive) type automobile in which a torque distribution unit 8c and double series differential gear device 15b for rear wheel tire use are added to FIG. 2 embodiment so that a drive torque is also transmitted from the drive shaft 4 to the rear wheel shafts 12a and 12b, and the other structure thereof is substantially the same as that of FIG. 2 embodiment. Further, since the double series differential gear device 15b for the rear wheel tire use is introduced, the double series differential gear device for the front wheel tire use is designated as 15a.

Accordingly, FIG. 5 embodiment is constituted so that all of the braking torque for the wheel shafts, in that the front wheel shafts 11a and 11b and the rear wheel shafts 12a and 12b are provided through the concentrated braking device 7, therefore, in FIG. 5 embodiment the braking devices 14a and 14b for wheel tires as provided in FIG. 2 embodiment are omitted.

The torque distribution unit 8c is activated by the hydraulic pressure supplied from the hydraulic pressure mechanism 13, and during braking operation distributes the braking torque provided from the concentrated braking device 7 among the front wheel shafts 11a and 11b and the rear wheel shafts 12a and 12b, and functions to establish proper braking force separately at the front wheel tires and at the rear wheel tires.

Accordingly, with FIG. 5 embodiment, likely, with a simple structure a possible unstable braking performance is avoided and a stable braking force can always be obtained. Moreover, since the individual braking devices for respective wheel tires are eliminated, the hydraulic pressure pipings therefor are also eliminated, therefore, the entire structure is greatly simplified.

Further, in FIG. 5 embodiment since a braking force distribution can be obtained with the torque distribution unit 8c, a proper braking force distribution depending on a road surface condition can always be obtained.

Figure 6:
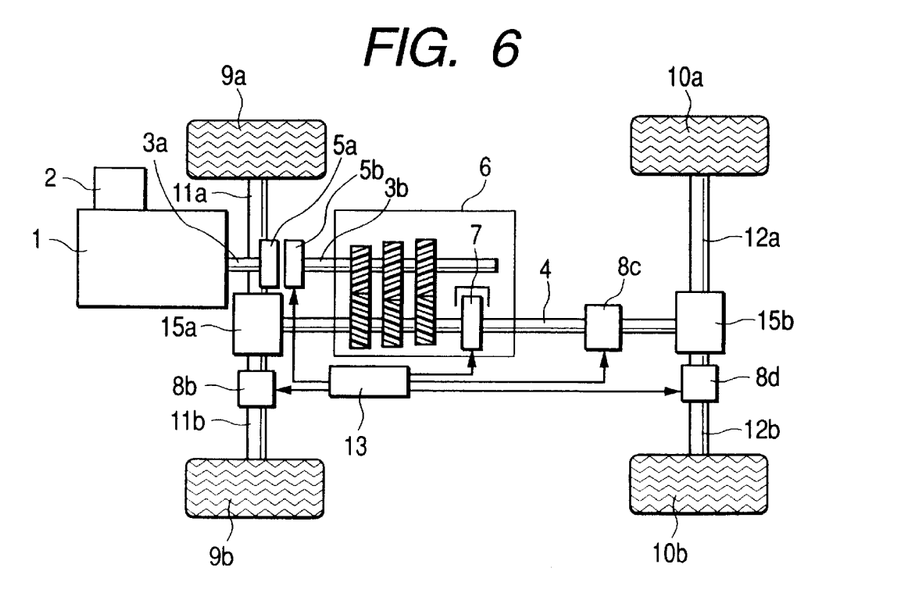
FIG. 6 is a system diagram showing a sixth embodiment of an automobile according to the present invention.

FIG. 6 is a sixth embodiment of the present invention. An automobile as shown in FIG. 6 corresponds to one in which torque distribution units 8b and 8d are further added to FIG. 5 embodiment and the other structure thereof is substantially the same as that of FIG. 5 embodiment.

During braking operation, the braking torque generated through activation of the concentrated braking device 7 in response to a hydraulic pressure command from the hydraulic pressure mechanism 13 is at first distributed properly to the front and rear devices by the torque distribution unit 8c on the drive shaft 4, and thus distributed braking torque is further distributed among right and left wheel tires by the torque distribution units 8b and 8d.

Accordingly, with the present embodiment the same advantages as those obtained by FIG. 5 embodiment are obtained as well as the braking torque distribution among all of the wheel tires can be easily adjusted, as a result, a proper braking condition can always be obtained.

Figure 7:
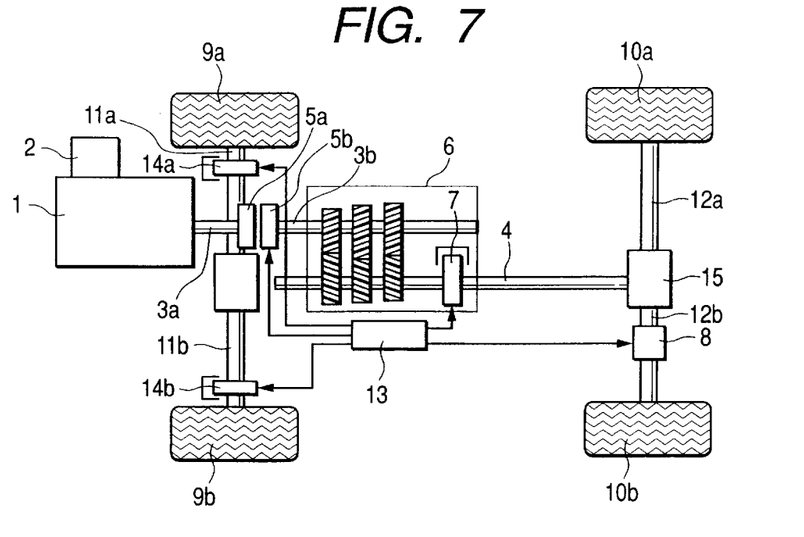
FIG. 7 is a system diagram showing a seventh embodiment of an automobile according to the present invention.

FIG. 7 is a seventh embodiment of the present invention, the automobile as shown in FIG. 7 corresponds to one in which a torque distribution unit 8 is added to FIG. 4 embodiment, thereby, during braking operation by the concentrated braking device 7 a braking torque distribution among the rear wheel tires 10a and 10b is obtained.

Accordingly, likely with FIG. 7 embodiment the same functions and advantages as obtained by FIG. 4 embodiment are obtained, moreover, through the braking torque distribution control among the rear wheel tires a proper braking condition depending on a road surface condition can always be obtained.

Figure 8:
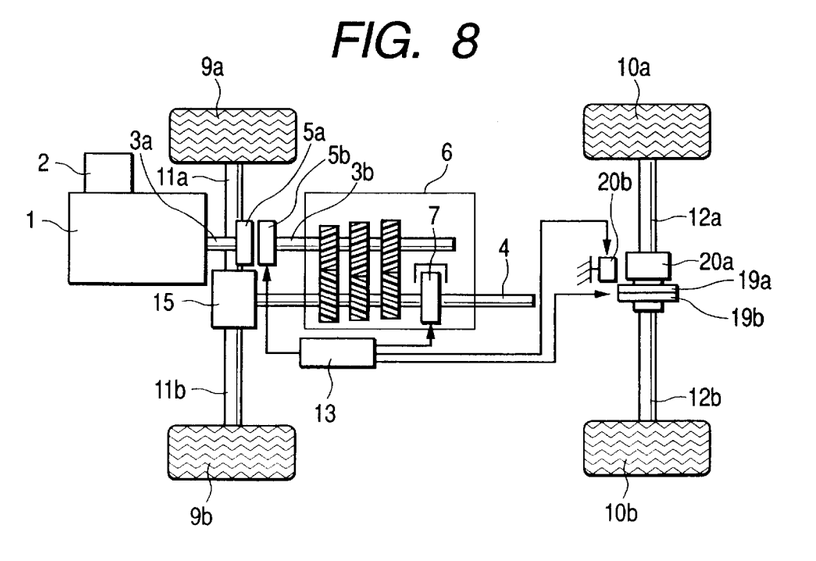
FIG. 8 is a system diagram showing a eighth embodiment of an automobile according to the present invention.

FIG. 8 is an eighth embodiment of the present invention, and the automobile as shown in FIG. 8 is provided, in place of the braking devices 14a and 14b for wheel tires in FIG. 2 embodiment, with a clutch mechanism constituted by clutch plates 19a and 19b and a braking device constituted by a brake disk 20a and a brake shoe.

More specifically, pressing force of the clutch plates 19a and 19b is controlled by a hydraulic pressure actuator (not shown) and the transmission torque thereof is controlled in response to the hydraulic pressure supplied from the hydraulic pressure mechanism 13, and the brake shoe 20b establishes a braking torque by being pressed to the brake disk 20a by a hydraulic actuator (not shown).

Normally, the clutch plates 19a and 19b are connected, therefore, a same braking torque is transmitted to the rear wheel tires 10a and 10b.

However, when transmission of different braking torques is necessitated such as due to difference in friction coefficients at right and left wheel tires, the connecting condition between the clutch plates 19a and 19b is relaxed by means of a hydraulic pressure command, thereby, respectively different braking torques can be transmitted to the rear wheel tires 10a and 10b.

The clutch plates 19a and 19b are not limited to the type shown in FIG. 8, and any multi plate type clutches can be used. Further, the structure is not necessarily limited to the clutch plate, any mechanical differential mechanisms can be used.

Still further, the braking device is also not necessarily limited to the type including the brake disk 20a and the brake shoe 20b, and an electrical braking device can be used therefor.

Figure 9:
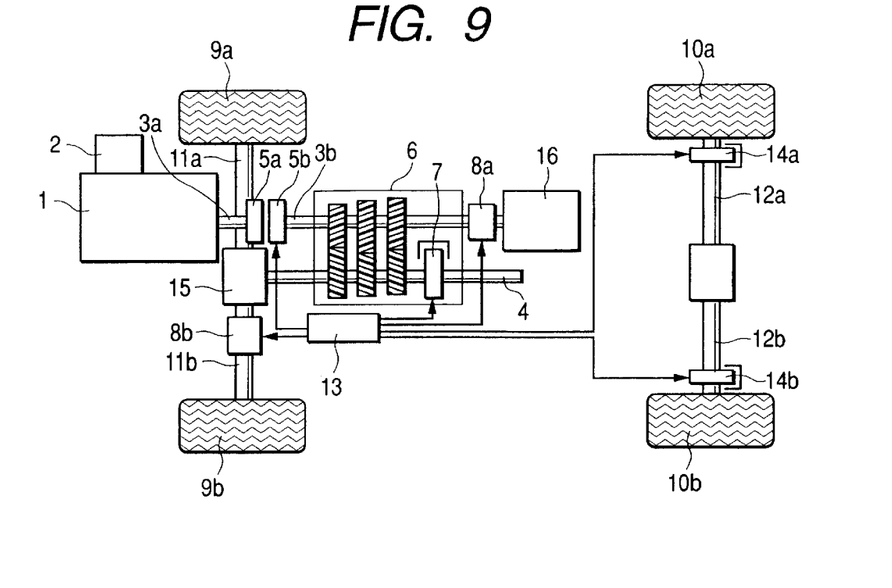
FIG. 9 is a system diagram showing a ninth embodiment of an automobile according to the present invention.

FIG. 9 is a ninth embodiment of the present invention and the automobile as shown in FIG. 9 corresponds to one in which an electric motor 16 coupled to the engine output shaft 3b via the torque distribution unit 8a and a torque distribution unit 8b mounted on the front wheel shaft 11b is provided.

Thus, FIG. 9 shows a so called FF type hybrid automobile, therefore, although not illustrated, other than the electric motor 16 a battery is provided and which is constituted to permit to use a driving torque from the electric motor 16 during travelling thereof as well as to use a regenerative braking torque during braking operation.

In the present embodiment, when an energy conversion efficiency is large when causing to operate the electric motor 16 as a generator such as during braking from a high speed travelling, the torque distribution unit 8a is activated and the torque of the engine output shaft 3b is transmitted to the electric motor 16 so as to operate as a generator.

Further, during coasting of the automobile, the electric motor 16 is caused to be operated as a generator, and the generated electrical energy, other than one used as it is, is supplied to a battery (not shown) and through charging of the battery a regenerative braking is activated to generate a necessary braking force.

Further, during the above regenerative braking operation the concentrated braking device 7 may be or may not be operated.

On the other hand, for example, during braking from a low speed travelling, in other words when no substantial energy conversion is expected even if the electric motor 16 is caused to operate as a generator, a control that the braking torque by the concentrated braking device 7 plays the main role for the braking force generation is performed.

Accordingly, with FIG. 9 embodiment substantially the same functions and advantages as those of FIG. 2 embodiment can be obtained, in that with a simple structure a possible unstable braking performance is avoided and a stable braking force can always be obtained, moreover, the inherent characteristic of a hybrid automobile which allows to regenerate the kinetic energy of the automobile can be utilized.

Figure 10:
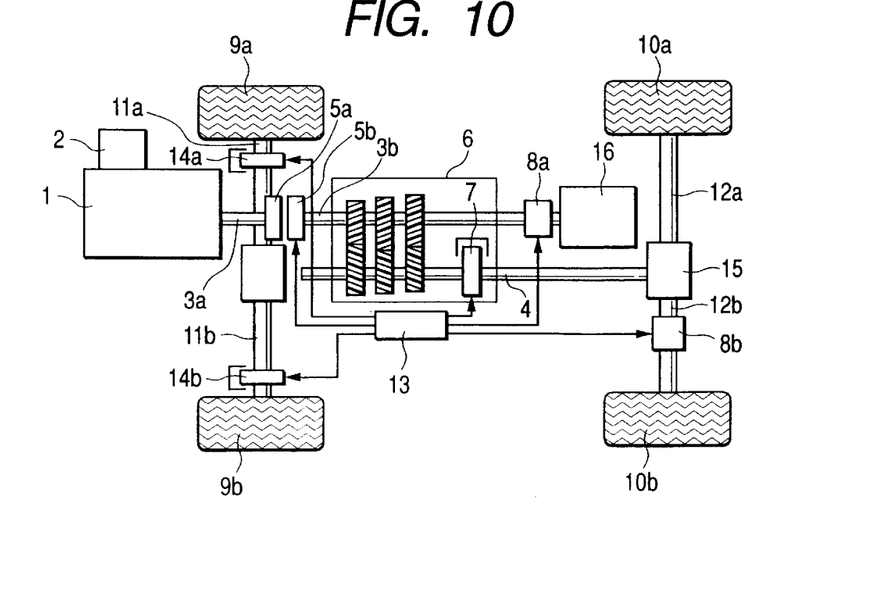
FIG. 10 is a system diagram showing a tenth embodiment of an automobile according to the present invention.

FIG. 10 is a tenth embodiment of the present invention and the automobile as shown in FIG. 10 corresponds to one in which the electric motor 16 coupled to the engine output shaft 3b via the torque distribution unit 8a and the toque distribution unit 8b provided on the rear wheel shaft 12b is added to FIG. 4 embodiment.

Thus, FIG. 10 shows a so called FR type hybrid automobile, therefore, although not illustrated, other than the electric motor 16 a battery is provided and which is constituted to permit to use a driving torque from the electric motor during travelling thereof as well as to use a regenerative braking torque during braking operation.

Accordingly, other than that the automobile is FR type, the functions and advantages of FIG. 10 embodiment are substantially the same as those of FIG. 9 embodiment.

Figure 11:
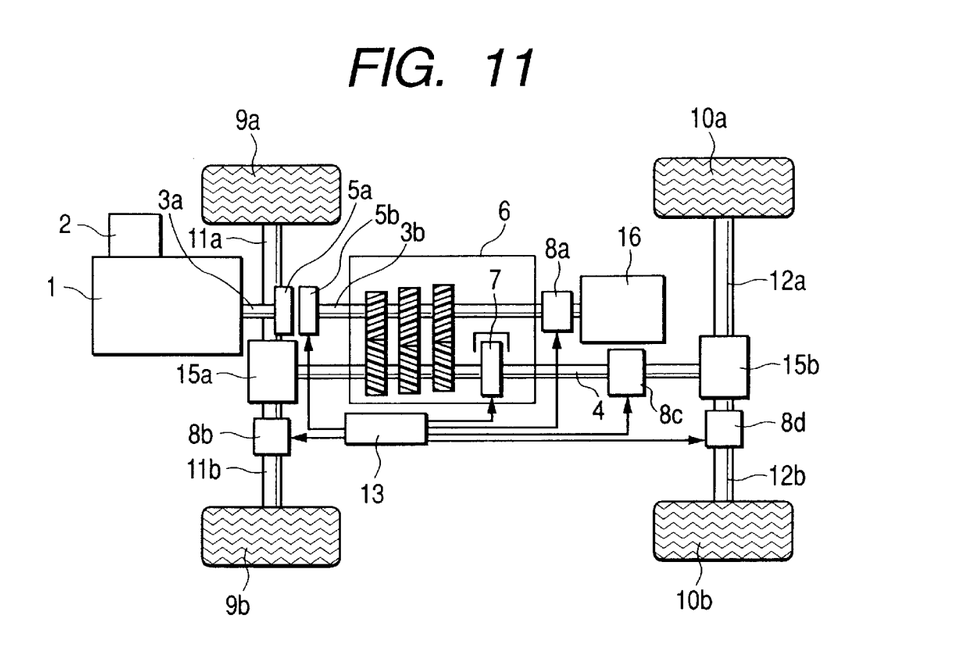
FIG. 11 is a system diagram showing a eleventh embodiment of an automobile according to the present invention.

FIG. 11 is an eleventh embodiment of the present invention in which the structure of the hybrid automobile as shown in FIG. 9 is applied to the 4WD type automobile as shown in FIG. 6.

Accordingly, other than that the automobile is 4WD type, the functions and advantages of FIG. 11 embodiment are substantially the same as those of FIG. 9 embodiment, therefore, the detailed explanation thereof is omitted.

Now, the double series differential gear devices 15, 15a and 15b which constitute to an important feature of the present invention will be explained with reference to FIG. 13.

Figure 13:
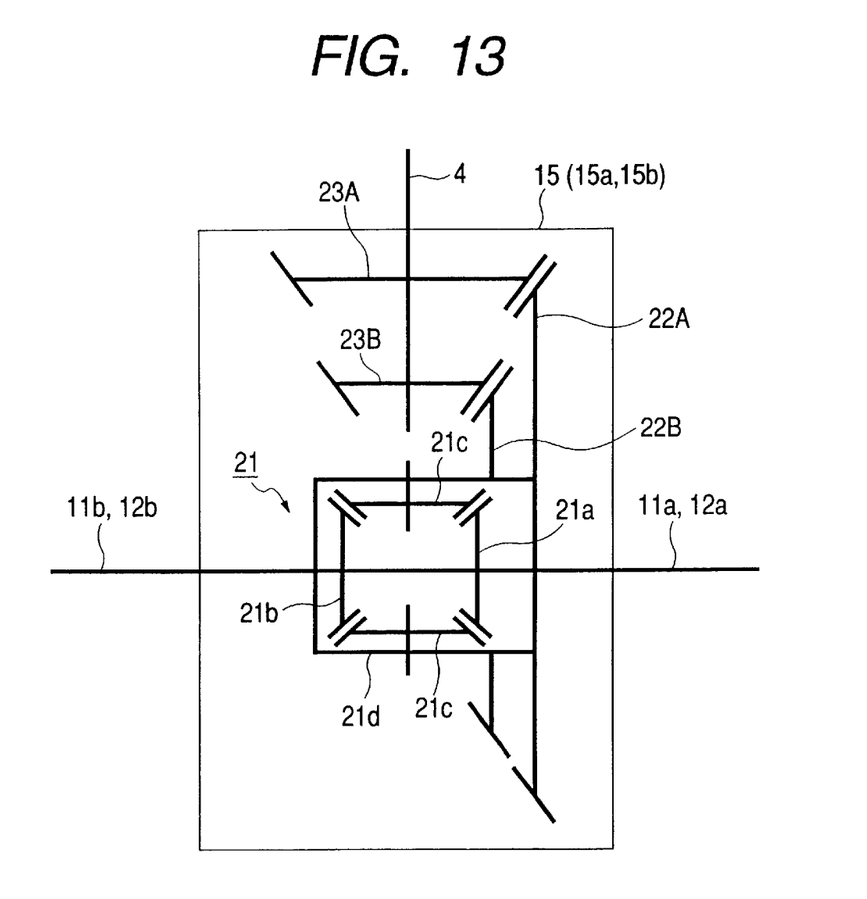
FIG. 13 is a view for explaining an example of a double series differential gear device used in any of the embodiment according to the present invention.

In FIG. 13, numeral 21 represents a differential gear mechanism, numeral 22A represents a first ring gear, numeral 22B represents a second ring gear, numeral 23A represents a first drive gear, and numeral 23B represents a second drive gear all of which are likely included in the double series differential gear devices 15, 15a and 15b.

The differential gear mechanism 21 is a well known one and is constituted by a bevel gear 21a for one side coupled to the front wheel shaft 11a (or 11b), another bevel gear 21b for the other side coupled to the rear wheel shaft 12a (or 12b), a plurality of bevel gears 21c which engage with both of the bevel gears 21a and 21b and a differential case 21d.

Through supporting the plurality of bevel gears 21c by bearings at the inner face of the cylindrical portion in the differential case 21d a planetary gear system is constituted, and through revolution of the differential case 21d which uses the front wheel shaft 11a (or 11b) and the rear wheel shaft 12a (or 12b) as its center axis, the differential case 21d performs the torque transmission function and through its self rotation at the same time the differential case 21d performs the function as the differential gear.

Both the first ring gear 22A and the second ring gear 22B are attached to the differential case 21d as well as are engaged respectively with the first drive gear 23A and the second drive gear 23B, both of which are respectively attached to the drive shaft 4.

Therefore, if only one set of first ring gear 22A and the first drive gear 23A or the second ring gear 22B and the second drive gear 23B is included, such corresponds to a usual differential gear device and constitutes a torque transmission system with a differential function between the drive shaft 4 and the right and left two front wheel shafts 11a and 11b and between the drive shaft 4 and the right and left two rear wheel shafts 12a and 12b.

However, the double series differential gear devices 15, 15a and 15b as shown in FIG. 13 each is provided with both the first gear series constituted by the first ring gear 22A and the first drive gear 23A and the second gear series constituted by the second ring gear 22B and the second drive gear 23B. Because of the above structure the differential gear device according to the present invention is named as double series differential gear device.

Herein, among the first gear series constituted by the first ring gear 22A and the first drive gear 23A and the second gear series constituted by the second ring gear 22B and the second drive gear 23B the diameters of the respective gears are varied under a same reduction speed ratio, in that as illustrated in FIG. 13 the diameters of the first ring gear 22A and the first drive gear 23A belonging to the first gear series are set larger than the diameters of the second ring gear 22B and the second drive gear 23B belonging to the second gear series, thereby, the differential gear device of double series is constituted.

Further, play clearances of engagement set for the respective gear combinations are differentiated among the first and second gear series, in that the play clearance of engagement set between the second ring gear 22B and the second drive gear 23B belonging to the second gear series is constituted larger than the play clearance of engagement set between the first ring gear 22A and the first drive gear 23A belonging to the first series gear.

More specifically, for example, under a same teeth pitch (arrangement dimension along the circumferential direction) between the first and second series gears, the tooth width (tooth size in circumferential direction) for the first series gear is determined larger than that for the second series gear.

As a result, when the phases of teeth for the first and second series gears are aligned, a condition that only the teeth of the respective gears belonging to the first series gear contact each other but the teeth of the respective gears belonging to the second series gear do not contact each other.

As a result, according to the double series differential gear devices 15, 15a and 15b as shown in FIG. 13, under a normal operating condition the torque transmission between the drive shaft 4 and the front wheel shaft 11a (and 11b) and the rear wheel shaft 12a (and 12b) is primarily performed through the first ring gear 22A and the first drive gear 23A belonging to the first series gear having a smaller play clearance of engagement, and between the second ring gear 22B and the second drive gear 23B belonging to the second series gear having a larger play clearance of engagement almost no teeth contacts occur and no torque is applied therebetween to keep a play condition.

However, as the result of sole use of the first series gear, for example, when fatigue is accumulated in the fist ring gear 22A and the first drive gear 23A belonging to the first series gear and an abnormality such as defects in teeth is caused, the teeth contacting condition between the first ring gear 22A and the first drive gear 23A belonging to the first series gear is lost, as a result, the teeth of the second ring gear 22B and the second drive gear 23B belonging to the second series gear begin to contact each other, and a condition that the torque is transmitted this time via the second ring gear 22B and the second drive gear 23B belonging to the second series gear is established.

Therefore, according to FIG. 13 embodiment when an abnormality such as defects in teeth is induced in the first ring gear 22A and the first drive gear 23A belonging to the first series gear because of sole use thereof for both drive and brake torque transmission, a back-up by the second ring gear 22B and the second drive gear 23B belonging to the second series gear is immediately obtained, thereby, no inconvenience with regard to torque transmission occurs, the brake is always ensured effective and the safety of the automobile is sufficiently kept.

Moreover, according to FIG. 13 embodiment under a normal operating condition the second ring gear 22B and the second drive gear 23B belonging to the second series gear are remained in a play condition with regard to torque transmission, there is no possible accumulation of stress fatigue therein so that the second series gear is kept as if it were new. Accordingly, the second series gear always can perform best in a possible back-up opportunity, thereby, a high reliability of the differential gear device is easily maintained.

The magnitude relationship of the play clearances of engagement among the first and second series gears is only an example, the magnitude relationship can be reversed, and the point of the present embodiment is that it is sufficient if the magnitudes in play clearances of engagement among two series gears are differentiated.

Further, in FIG. 13 embodiment, bevel gears are exemplified for the ring gear and the drive gear. However, hypoid gears which are broadly used in passenger cars can be used therefor, and further, in a case of bevel gears helical gears other than the straight teeth gears can be used.

Hereinabove, several embodiments have been explained, however, the present invention is not limited to the respective embodiment systems, for example, a braking device can be provided both at the output shaft and the drive shaft, further in addition thereto even when other braking device such as a regenerative braking device or a braking device for wheel tires is used together, the performance of the present invention is not degraded.

Further, within the scope of the present invention, parts of the plurality of embodiments can be combined and exchanged.

According to the present invention, even when a plurality of braking devices are collected into a concentrated braking device, a high reliability is easily maintained, therefore, the braking device can be formed into a unit. As a result, the braking device is hardly affected by the environment concerned such as rain, snow and muddy road, thereby, a stable braking force can always be obtained under any environmental conditions.

Further, since the braking devices are collected, the operating medium pipings such as for hydraulic pressure can be simplified, thereby, light weighing and costdown of the braking device can fully be achieved.

Accordingly, a highly reliable braking device with a reduced cost can be obtained and an automobile with a higher safety property can be easily provided.

What is claimed is:

1. A driving device, comprising a clutch for transmitting an engine output; an output shaft operatively connected to the clutch; a driving shaft arranged to receive output of the output shaft and to be driven thereby; a double series differential gear mechanism configured to transmit output from the driving shaft to wheel tires; a centralized braking device configured to brake the driving shaft and including a transmission: and a hydraulic pressure mechanism configured to drive the clutch and centralized braking device disposed between the output shaft and the driving shaft so as to set a rotational speed of the driving shaft.

2. A driving control device, comprising a driving shaft to drive wheels via a double series differential gear mechanism, a centralized braking device associated with the driving shaft, and a control configured to selectively actuate the centralized braking device in response to a command and to establish a desired rotational speed of the driving shaft.

* * * * *